United States Patent
Penn et al.

(10) Patent No.: US 11,042,919 B2
(45) Date of Patent: Jun. 22, 2021

(54) METHODS OF CAPTURING IMAGES AND MAKING GARMENTS

(71) Applicant: Bit Body, Inc., San Francisco, CA (US)

(72) Inventors: Miles Penn, San Francisco, CA (US); Rafael Witten, San Francisco, CA (US)

(73) Assignee: BIT BODY, INC., San Francisco, CA (US)

( * ) Notice: Subject to any disclaimer, the term of this patent is extended or adjusted under 35 U.S.C. 154(b) by 277 days.

(21) Appl. No.: 15/538,650

(22) PCT Filed: Dec. 14, 2015

(86) PCT No.: PCT/US2015/065489
§ 371 (c)(1),
(2) Date: Jun. 21, 2017

(87) PCT Pub. No.: WO2016/105992
PCT Pub. Date: Jun. 30, 2016

(65) Prior Publication Data
US 2017/0372395 A1 Dec. 28, 2017

Related U.S. Application Data

(60) Provisional application No. 62/096,517, filed on Dec. 23, 2014.

(51) Int. Cl.
*G06Q 30/06* (2012.01)
*G06T 15/20* (2011.01)

(52) U.S. Cl.
CPC ..... *G06Q 30/0621* (2013.01); *G06Q 30/0625* (2013.01); *G06Q 30/0643* (2013.01); *G06T 15/205* (2013.01); *G06T 2215/16* (2013.01)

(58) Field of Classification Search
CPC .................................................. G06T 2210/16
See application file for complete search history.

(56) References Cited

U.S. PATENT DOCUMENTS

| | | | | |
|---|---|---|---|---|
| 6,608,650 | B1* | 8/2003 | Torres | H04N 5/232 348/231.3 |
| 8,737,767 | B2* | 5/2014 | Hodgins | G06F 17/50 382/285 |
| 9,696,897 | B2* | 7/2017 | Garcia | G01B 11/02 |
| 2003/0020718 | A1 | 1/2003 | Marshall et al. | |
| 2006/0020486 | A1* | 1/2006 | Kurzweil | G06K 9/228 382/111 |
| 2006/0140463 | A1* | 6/2006 | Rutschmann | A61B 5/0064 382/128 |
| 2008/0089580 | A1* | 4/2008 | Marcu | H04N 1/603 382/162 |
| 2009/0016565 | A1* | 1/2009 | Kulumani | G06Q 10/00 382/100 |
| 2009/0182674 | A1 | 7/2009 | Patel | |
| 2009/0297062 | A1* | 12/2009 | Molne | G06F 3/0304 382/289 |
| 2010/0319100 | A1* | 12/2010 | Chen | G01B 11/2513 2/69 |
| 2011/0191070 | A1* | 8/2011 | Ramalingam | G06F 17/50 703/1 |
| 2011/0274250 | A1* | 11/2011 | Gray | G01V 5/0008 378/87 |
| 2013/0051696 | A1* | 2/2013 | Garrett | G01B 11/245 382/254 |
| 2013/0108121 | A1* | 5/2013 | de Jong | G06Q 30/06 382/111 |
| 2013/0170715 | A1* | 7/2013 | Reed | G06F 17/5009 382/111 |
| 2013/0197793 | A1* | 8/2013 | Vaddadi | G06F 17/00 701/300 |
| 2013/0222599 | A1* | 8/2013 | Shaw | G06K 9/60 348/159 |
| 2013/0229534 | A1* | 9/2013 | Panay | G06F 1/1618 348/207.1 |
| 2013/0246212 | A1 | 9/2013 | Sullivan | |
| 2013/0315475 | A1* | 11/2013 | Song | G06K 9/00369 382/154 |
| 2014/0300722 | A1* | 10/2014 | Garcia | G01B 11/02 348/77 |
| 2014/0341484 | A1* | 11/2014 | Sebring | G06T 15/205 382/284 |
| 2015/0154453 | A1* | 6/2015 | Wilf | G06K 9/00711 382/103 |
| 2016/0117749 | A1* | 4/2016 | Desmarais | A41H 3/007 382/111 |
| 2019/0172114 | A1 | 6/2019 | Penn et al. | |

FOREIGN PATENT DOCUMENTS

WO 2014084875 A2 6/2014
WO WO-2016105992 A1 6/2016

OTHER PUBLICATIONS

PCT/US2015/065489 International Search Report and Written Opinion dated Apr. 14, 2016.
U.S. Appl. No. 16/267,029 Office Action dated Apr. 4, 2019.

* cited by examiner

*Primary Examiner* — Gandhi Thirugnanam
(74) *Attorney, Agent, or Firm* — Wilson Sonsini Goodrich & Rosati

(57) ABSTRACT

This disclosure relates to better methods for making garments, for example by capturing images of a subject and making garments for that subject without requiring the subject to visit a tailor for conventional measurement with a tape measure. The disclosed methods provide a faster, easier, and more convenient way to acquire measurements. The disclosed methods also provide better fitting garments and higher customer satisfaction.

11 Claims, No Drawings

METHODS OF CAPTURING IMAGES AND MAKING GARMENTS

TECHNICAL FIELD

This disclosure relates to the making garments, particular measuring, fitting, and making custom clothes and accessories for specific people.

BACKGROUND

With the development and adoption of online shopping platforms, many consumers do a large amount of their shopping over the Internet. Online shopping allows the consumer to compare a variety of brands within a product category without needing to travel to a store. Accordingly, online shopping gives the consumer more options and greater convenience.

Shopping for clothes presents one significant challenge for the online shopper. Although shoppers can view and compare clothing brands and styles, those shoppers are unable to select clothes based on precise fit. Although some varieties of clothing are available in broadly defined size categories; other types of clothes are frequently made for one customer in particular.

Custom garments (e.g., dress shirts) are made specifically for an individual customer in order to guarantee that the garment fits that customer well. Making garments for one specific person requires observing the dimensions of that person to ensure proper fit. The advantage of good fit comes at a cost: the customer must travel to the vendor to be measured before the custom garment can be made. Custom garment measurements are traditionally taken by a tailor, i.e., a person whose occupation is making fitted clothes such as suits, pants, jackets, etc. to fit individual customers.

Before this disclosure, a person shopping for custom garments was forced to choose between (A) shopping convenience and (B) goodness of fit. Furthermore, traditional custom garments are significantly more expensive than those with broadly defined sizes because each garment requires first acquiring a set of custom measurements by an expert in taking such measurements.

There exists an ongoing need for providing consumers with garments that fit well, without requiring the consumer to seek out a tailor each time the consumer wishes to purchase a garment. Furthermore, there exists a need for quickly and easily acquiring a person's measurements from a chosen convenient location. Furthermore, there exists a need for conveniently capturing an image or video of a person without requiring the person to cycle through multiple iterations of repositioning a camera.

DETAILED DESCRIPTION

Better methods for making garments have now been developed.

Better methods of capturing images of a subject have now been developed.

Disclosed herein are methods of capturing an image of a subject and making garments for that subject, without requiring the subject to visit a tailor for conventional measurement with a tape measure. The disclosed methods provide a faster, easier, and more convenient way to acquire measurements. The disclosed methods also provide better fitting garments and higher customer satisfaction.

Disclosed herein is a method for capturing an image of a subject, comprising:

identifying a mobile device having a top, a bottom, a camera, and a means for detecting the orientation of the mobile device;

fixing the bottom of the mobile device at a vertical position, relative to the subject;

identifying the angle of the mobile device, relative to a base plane;

identifying the optimal angle of the camera, relative to the base plane; and capturing an image via the camera.

As used herein, the term "image" means a reproduction or imitation of the form of a person or thing, i.e., a subject. For example, the term image would include any optical counterpart of an object produced by an optical device (such as a lens) or an electronic device (such as a digital camera). The term "image" should also be read to include any visual representation of something, e.g., a likeness of an object produced on a photographic material or a picture produced on an electronic display (such as a television or computer screen). Further, it should be understood that "an image" could include multiple images, for example, a sequence of images that can be taken together to form a video.

As used herein, the term "subject" means a person or thing that is at issue. Within the context of capturing and image, the term "subject" means the person or thing that is being captured in the image.

As used herein, the term "mobile device" means a handheld, handheld device or handheld computer, which includes practically any readily portable computing device, including a laptop computer. In many circumstances, mobile devices are equipped with a touch or non-touch display screen and sometimes, a mini keyboard. There are many types of mobile devices, the commonest among them being, mobile phones, tablets, smartphones, PDAs, pagers, and Personal Navigation Devices.

As used herein, the terms "top" and "bottom" mean (a) the highest or uppermost point, part, or surface of something and (b) the lowest or lowermost point, part, or surface of something, respectively. As used herein, the terms highest and lowest should be measured relative to the ground or earth. For illustration, in the case of a mobile device, the "bottom" would be the part of the mobile device most often oriented closest to the ground or floor.

As used herein, the term "camera" means an optical instrument that records images that can be stored directly, transmitted to another location, or both. These images may be still photographs or moving images such as videos or movies. Many mobile devices come equipped with an onboard camera, which should be considered within the scope of "camera" in this disclosure.

As used herein, the term "vertical position relative to the subject" means the height or up/down position relative to the subject. For example, in the case of fixing the vertical position of a mobile device relative to the subject, the mobile device may be positioned on the same plane upon which the subject is positioned. For example, the mobile device may be placed on the floor upon which a human subject is standing. In another example, a mobile device may be leaned against a wall or other vertical object that is about perpendicular to the ground or floor.

As used herein, the term "base plane" means the surface upon which the mobile device is positioned, i.e., the plane of contact that is perpendicular to force of gravity. For example, in the case where the mobile device is placed on a floor, the "base plane" would be that floor. Similarly, in the case where the bottom of the mobile device is placed on the ground, the "base plane" would be that ground. In one embodiment, the base plane is the surface upon which the subject stands.

In one embodiment, the "base plane" is substituted with a stand or hanging device, which holds the mobile device stationary at a particular angle and height without moving.

As used herein, the term "angle of the camera, relative to the base plane," refers to the angle formed between the planar surface of the camera lens and the base plane. For example, in the case of a mobile device positioned on a floor and leaned against a wall, the "angle of the camera" would be the angle formed between the flat surface of the mobile device (including the camera) and the floor. Within the context of this disclosure, the angle formed between the planar surface of the camera lens and the base plane refers to the acute angle formed by these two reference planes, such that the camera is pointed upwards from the base plane.

As used herein, the term "means for detecting the orientation of the mobile device" includes any device or collection of devices that quantifies the angle of the device relative to a base plane, such as the floor or Earth. For example, a "means for detecting the orientation of the mobile device" includes an accelerometer, gyroscope, conventional level, or other gravity sensor.

As used herein, the term "optimal angle" means the best angle for capturing an image of the subject with the camera of the mobile device. In one embodiment, the term optimal angle means an angle that allows positioning the subject as close a possible to the camera, while keeping the entire subject within the frame of the image captured by the camera. In another embodiment, the "optimal angle" means an angle that allows positioning the subject as close a possible to the camera, while keeping the entire subject within the frame of the image captured by the camera and also providing a buffer region in the captured image.

In one embodiment, the optimal angle of the camera is about 65 to 80 degrees. In one embodiment, the optimal angle of the camera is about 60 to 75 degrees. In another embodiment, the optimal angle of the camera is chosen to minimize the distance between the camera and the subject while including the entire subject in the image. In one embodiment, the optimal angle of the camera is chosen to minimize the distance between the camera and the subject while including the entire subject in the image and also providing a buffer along the edges of the image frame. As used in this context, the term "buffer" means a portion along the outside or edge of the image frame that does not include a part of the subject. In some cases, the "buffer" is sufficient to accommodate a particular amount of angular variation in the angle of the camera without excluding portions of the subject from the image frame. In one example, the buffer allows for deviations of between 0.01 to 10 degrees without excluding portion of the subject from the image frame. In one example, the buffer allows for deviations of between 1 to 5 degrees without excluding portion of the subject from the image frame.

As used herein, the term "capturing an image" means acquiring a visual representation of the subject. As used herein, "capturing" includes recording and storing directly and transmitting to another location for recording, storage, presentation, or treatment of captured image data.

In one embodiment, the disclosed method for capturing an image of a subject, comprises: identifying the angle of the mobile device by measuring gravitational force readings relative to an axis or set of axes defined for the mobile device. In one example, the method of capturing an image includes the subject's whole body. In one example, the method of capturing an image does not require contacting a human.

In one embodiment, the disclosed method for capturing an image of a subject comprises: displaying realtime information about the angle of the mobile device via a display means of the mobile device. In one embodiment, the mobile device displays a representation of a target or goal angle and also displays the current angle of the mobile device throughout a period when the user is positioning the mobile device.

In one embodiment, the disclosed method for capturing an image of a subject, comprises a comparison between the angle of the mobile device and a goal angle for the device.

In one embodiment, the disclosed method for capturing an image of a subject, comprises fixing the bottom of the mobile device at a vertical position of about zero, for example by placing the bottom of the mobile device on the floor, ground, or earth.

In one embodiment, the disclosed method for capturing an image of a subject comprises: identifying the height of the subject. In one embodiment, identifying the height of the subject comprises comparing the size of the subject in a captured image to the size of a reference object in that same image. As used herein the term "reference object" means any object (e.g., a 12 oz soda can or credit card) having known or standard dimensions that can be used to assess the dimensions of a subject by comparing their relative sizes within the image.

In another embodiment, identifying the height of the subject comprises accepting user input, either by capturing numerical information, for example, by voice or keypad input. For example, in one embodiment, a mobile device application utilizing the disclosed method of capturing an image of a subject prompts the user for height and/or weight information.

In one embodiment, the disclosed method for capturing an image of a subject, comprises:
  identifying the make and model of the mobile device;
  fixing the bottom of the camera at a vertical position of about zero;
  identifying the height of the camera relative to the vertical position; and
  fixing the distance from the subject to the camera.

In one embodiment, the distance from the camera is about 1 to 20 feet. In another embodiment, the distance from the camera is about 5 to 15 feet. In another embodiment, the distance from the camera is about 8 to 12 feet. In another embodiment, the distance from the camera is about 10 feet. In another embodiment, the distance from the camera is set by accounting for the field of view of the camera, in order to include the subject's entire body, so that no part of the subject's body is out of the frame. In another embodiment, the distance from the camera is set by accounting for the field of view of the camera, in order to include the subject's entire body and a buffer region, so that no part of the subject's body is out of the frame.

In one embodiment, the method of identifying the optimal angle of the camera comprises: optimizing the distance from the subject to camera to minimize the distance from the subject to the camera while fully capturing the subject.

Disclosed herein is a method for measuring a person, comprising:
  capturing a video of the person;
  segmenting the video into individual image frames;
  fixing the height of the person;
  generating a 3D model of the person;

determining the length of a line drawn along a portion of the 3D model of the person.

As used herein the phrase "capturing a video of the person" means recording the person and creating a reproduction or imitation of the form of the person, for example a visual representation of the person. In one embodiment, capturing a video of the person includes using a camera equipped with a digital storage means. For example, in one embodiment, capturing a video of the person includes using the onboard camera of a mobile device to record a video of the person. In one embodiment of this disclosure, capturing a video of the person involves recording an image including the whole person, from head to toe. In an alternative embodiment, capturing a video of the person involves recording an image including less than the whole person, for example only from the waist to the head or only from the waist to the feet.

In one embodiment, capturing a video of the person comprises recording video from one fixed point and rotating the person along a vertical axis defined by the longitudinal axis of the person. In one embodiment, capturing a video of the person comprises rotating the person 360 degrees along a vertical axis defined by the longitudinal axis of the person. In one example, capturing a video of the person comprises fixing a mobile device on the floor and capturing a video of the person standing and spinning in place with the mobile device's onboard camera and recording means.

As used herein, the phrase "segmenting the video into individual frames" means partitioning a video (which is a series of digital images) into a series of individual images. Within the context of this disclosure, the goal of segmentation is to simplify the information contained in the full captured video of the person into something that is more meaningful and easier to analyze. In one embodiment, segmenting the image comprises selecting individual image frames in order to provide a collection of images of the person, said collecting including individual images showing the person standing at different angles relative to the device capturing the video.

In one embodiment capturing the person at "different angles relative to the device capturing the video" is accomplished by holding the position of the device capturing the video stationary, while the person stands and rotates (aka spins) around an axis running through the person's longitudinal axis and perpendicular to the floor, ground, or earth. In one embodiment, segmenting the video into individual image frames comprises selecting image frames showing the person at different angles within about 360 degrees of rotation about the person's longitudinal axis and perpendicular to the floor, ground, or earth. In one embodiment, "segmenting the video into individual frames" comprises selecting between about 4 to about 400 individual image frames from within the video of the person rotating about longitudinal axis. Within the context of this disclosure, the selected image frames show the person from different angles (i.e., "degrees of rotation about the person's longitudinal axis"). In another embodiment, segmenting the video into individual frames" comprises selecting between about 6 to about 100 individual image frames from within the video of the person rotating about longitudinal axis. In another embodiment, "segmenting the video into individual frames" comprises selecting between about 8 to about 20 individual image frames from within the video of the person rotating about longitudinal axis.

In some embodiments of the disclosure "segmenting the video into individual frames" is facilitated by capturing a background frame. As used herein, the term "background frame" means an image of the backdrop of the scene or surface against which the video of the person is captured. In an example where "capturing a video of the person" comprises acquiring a video of the person spinning in front of a wall, capturing a background frame would comprise recording an image of that wall, keeping substantially all aspects of the image frame the same, but without the person present.

As used herein, the term "fixing the height of the person" means acquiring the standing length of the person in the video as conventionally measured from the bottom of the feet to the top of the head. Within the context of this disclosure, acquiring the standing length (or height) of this person may be accomplished by any means known in the art. For example, the height of the person may be acquired by prompting the person for this information. Prompting the person may be accomplished by programing the mobile device to request that the person enter the height information by typing, selecting, or speaking his or her height. In another example, the person's height information may be accomplished by including an object of standard size within the video of the person. In one embodiment, "fixing the height of the person" comprises identifying an object of standard size (e.g., a compact disk, twelve ounce soda can, etc.) within the video and deducing the height of the person by comparing the size of the known, standard object, to the size of the person in the video.

As used herein, the phrase "generating a 3D image of the person" means synthesizing a three dimensional representation of that person. For example, within the context of this disclosure, "generating a 3D image of the person" can be accomplished by acquiring a series of two dimensional images of the person, from a variety of different angles, then using those images to develop a three dimensional representation of the person. Generating a 3D image from two dimensional images can be accomplished by using a variety of known modeling programs. In one embodiment, the term "generating a 3D image of the person" means generating a 3D image of the entire person. In one embodiment, the term "generating a 3D image of the person" means generating a 3D image of part of the person.

As used herein, the phrase "determining the length of a line drawn along a portion of the 3D model of the person" means calculating the distance of a specified path along the surface of the exterior or the 3D model of the person.

In one embodiment, the disclosed method of measuring a person comprises dividing the pixels of individual image frames into a foreground group and a background group. In one example, this dividing is accomplished by distinguishing the parts of the image attributed to the person from the part of the image that appears to be in the distance and that provides relief for the person in the foreground. In one embodiment, dividing the pixels is accomplished by a human capable of identifying a person from and object (or objects) that is not a person. In another embodiment, available image editing software may be used to facilitate distancing the person from the background. In another embodiment, a combination of human input and computer software is used for dividing the pixels of individual image frames into a foreground group and a background group.

In one embodiment, the method for measuring a person comprises optimizing the dividing of pixels. In one example, optimizing the dividing comprises:
  identifying the height of the human;
  querying a human shape model database for a model human having the height of the human and forming the pose of the human in the individual image frame;

overlaying the outline of the model human with the outline of the human in the individual image frame;

comparing the outline of the model human with the outline of the human in the individual image frame; and modifying the model of the human by adjusting the outline of the human in the individual image frame.

Disclosed herein is a method of making a garment, comprising:

capturing a video of a person from a plurality of angles;

segmenting the video into individual images;

dividing the pixels of the individual images into a foreground group and a background group;

generating a 3D model of a person;

using a digital tape measure to acquire certain measurements along the exterior of the 3D model of a person;

fitting the set of measurements for the person to a set of measurements for a garment.

In one embodiment, "fitting the set of measurements for the person to a set of measurements for a garment" comprises identifying fitting preferences or styles from the person.

As used herein, the term "garment" includes any clothing or accessory. Within the context of this disclosure, the term garment includes (but is not limited to) belts, boots, boxer-briefs, briefs, boxers, swimsuits, coats, jackets, gloves, hats, pajama pants, pajama bottoms, pants, jeans, t-shirts, button down shirt, polo shirts, shirts, sandals, sneakers, shoes, shorts, athletic shorts, compression shorts, socks, sweaters, sweatshirts, undershirts, underwear, blazers, sport coats, dress shirts, hoodies, fleeces, robes, suits, tuxedos, formalwear, watches, dresses, jumpsuits, rompers, leggings, lingerie, skirts, tops, and vests.

As used herein, the term "digital tape measure" means a device that determines the planar measurement of a person by using a 3D model of a person. For example, using a digital tape measure to measure a person in one dimension (e.g., a waist, hip, or neck measurement), can be accomplished by computing the intersection of a triangular mesh representing one body part (e.g, an arm) with a plane. The set of line segments in the intersection is a closed loop, the length of which is measured. In another example, the digital tape measure determines the length of the convex hull, which can be used to mimic the data acquired by a human tailor physically placing a tape measure in one plane around the person's body. In one embodiment, the digital tape measure determines the shortest path on the mesh between the two points on the 3D model of a person. This system of measurement has been found effective at mimicking curved measurements, e.g., measuring a shoulder width or a sleeve length on a human subject.

In at least one embodiment, acquiring certain measurements along the exterior of the 3D model of a person is accomplished by using a corresponded 3D model of a person. Within the context of this disclosure, two meshes are corresponded when a map exists between their surfaces. Within the context of the disclosed methods, using a model including corresponded meshes preserves reference points. Within the context of this disclosure, using corresponded meshes of people provides advantage that any point of interest on one mesh would map to the same point on the other mesh. For example, knee cap to knee cap, belly button to belly button, top of shoulder to top of shoulder.

In some embodiments of the method of making a garment, the "fitting" is optimized by maximizing customer satisfaction for each set of measurements. As used herein, the term "maximizing customer satisfaction for each set of measurements" means attaining the highest possible grade for user feedback. In one embodiment, "maximizing customer satisfaction for each set of measurements" includes soliciting feedback from the person receiving a particular garment and correlating that feedback with the set of measurements for the person and the set of measurements for the garment.

In one embodiment, "maximizing customer satisfaction for each set of measurements" includes modifying the relationship between the "set of measurements for the garment" and the "set of measurements for the person."

Disclosed herein is a method of receiving input from a mobile device user, comprising:

capturing video of the mobile device user;

measuring motion in the video;

identifying a minimum threshold for the motion in the video; and preforming a process when the motion in the video falls below the minimum threshold.

As used herein, the phrase "measuring motion in the video" means determining how much movement is occurring in the video, for example, how much (or how little) the subject is moving. In one example, a person walking, spinning, gesticulating, or moving the arms or legs could qualify as an actively moving subject. In one contrasting example, a person standing rigidly erect without moving the arms and legs could be considered still or motionless.

As used herein, the phrase "identifying a minimum threshold for the motion in the video" means defining an amount of movement or motion that should be interpreted as still or motionless.

As used herein, the phrase "performing a process" means initiating or launching a predetermined action or series of actions. In one embodiment, a "process" is advancing a series of data acquisition steps. In one example, the disclosed method comprises capturing video of a mobile device user and interpreting stillness as an instruction to advance the user experience. In one embodiment, the mobile device captures video of a person until the person stands still to signify readiness for the next step in an application process. Upon recognizing the stillness in the frame, the method of receiving input advances the application process to the next step. This method provides the advantage of allowing the user to communicate readiness to the mobile device from a distance and without moving or touching the mobile device.

As used herein, the phrase "motion in the video falls below the minimum threshold" means that the amount of movement within the captured video, when quantified, is less than a pre-determined value. The motion in the video may be quantified by a variety of means for measuring motion within an image or collection of images, for example by comparing difference between frames in a sequence of images. The threshold can be set to any value defining an amount of motion.

Although the present invention herein has been described with reference to various exemplary embodiments, it is to be understood that these embodiments are merely illustrative of the principles and applications of the present invention. Those having skill in the art would recognize that various modifications to the exemplary embodiments may be made, without departing from the scope of the invention.

Moreover, it should be understood that various features and/or characteristics of differing embodiments herein may be combined with one another. It is therefore to be understood that numerous modifications may be made to the illustrative embodiments and that other arrangements may be devised without departing from the scope of the invention.

Furthermore, other embodiments of the invention will be apparent to those skilled in the art from consideration of the specification and practice of the invention disclosed herein. It is intended that the specification and examples be considered as exemplary only, with a scope and spirit being indicated by the claims.

Finally, it is noted that, as used in this specification and the appended claims, the singular forms "a," "an," and "the," include plural referents unless expressly and unequivocally limited to one referent, and vice versa. As used herein, the term "include" or "comprising" and its grammatical variants are intended to be non-limiting, such that recitation of an item or items is not to the exclusion of other like items that can be substituted or added to the recited item(s).

We claim:

1. A method for capturing an image of a body of a subject, the method comprising:
    receiving a mobile device comprising a top, a bottom, a camera, and an accelerometer or a gyroscope for detecting an angle of the camera relative to a surface upon which the subject is standing;
    placing the mobile device on the surface upon which the subject is standing so that the mobile device is at a fixed vertical position relative to the surface upon which the subject is standing;
    identifying an angle of the mobile device relative to the surface upon which the subject is standing using the accelerometer or the gyroscope;
    displaying, on the mobile device, information used to adjust the mobile device so that the mobile device is positioned at an optimal angle relative to the surface upon which the subject is standing; and
    capturing the image of the body of the subject with the camera while the mobile device is positioned at the optimal angle, wherein capturing the image of the body of the subject with the camera while the mobile device is positioned at the optimal angle results in the body of the subject appearing entirely within the image of the body of the subject.

2. The method of claim 1, wherein identifying the angle of the mobile device comprises measuring gravitational force readings relative to an axis or set of axes defined for the mobile device.

3. The method of claim 1, comprising displaying information about the angle of the mobile device via a display means of the mobile device.

4. The method of claim 3, wherein the information comprises a comparison between the angle of the mobile device and the optimal angle.

5. The method of claim 1, wherein identifying the angle of the mobile device comprises the step of fixing the bottom of the mobile device at a vertical position of about zero degrees.

6. The method of claim 1, comprising identifying a height of the subject.

7. The method of claim 1, comprising:
    identifying the make and model of the mobile device;
    fixing the bottom of the mobile device relative to the surface upon which the subject is standing; and
    identifying a height of the camera relative to the surface upon which the subject is standing.

8. The method of claim 1, wherein the optimal angle is 65 to 80 degrees.

9. The method of claim 1, wherein the optimal angle is 60 to 75 degrees.

10. The method of claim 1, comprising prompting a mobile device user to input numerical data.

11. The method of claim 1, further comprising receiving an input comprising a height of the subject.

* * * * *